United States Patent [19]

Yamaguchi

[11] Patent Number: 5,052,246

[45] Date of Patent: Oct. 1, 1991

[54] MOTOR VEHICLE WITH LINE PRESSURE CONTROL FOR AUTOMATIC TRANSMISSION

[75] Inventor: Hiroshi Yamaguchi, Yokohama, Japan

[73] Assignee: Nissan Motor Co., Ltd., Yokohama, Japan

[21] Appl. No.: 510,554

[22] Filed: Apr. 18, 1990

[30] Foreign Application Priority Data

May 19, 1989 [JP] Japan .................................. 1-126229

[51] Int. Cl.$^5$ ........................ B60K 41/04; B60K 41/06; B60K 41/12

[52] U.S. Cl. ........................................ 74/866; 74/878; 364/424.1

[58] Field of Search ................ 74/866, 878; 364/424.1

[56] References Cited

U.S. PATENT DOCUMENTS

| | | | |
|---|---|---|---|
| 4,791,568 | 12/1988 | Hiramatsu et al. | 74/866 X |
| 4,798,105 | 1/1989 | Takase et al. | 74/866 |
| 4,838,124 | 6/1989 | Hamano et al. | 74/866 |
| 4,838,125 | 6/1989 | Hamano et al. | 74/866 |
| 4,846,021 | 7/1989 | Hamano et al. | 74/866 |
| 4,928,557 | 5/1990 | Takada et al. | 74/866 X |
| 4,939,957 | 7/1990 | Asano et al. | 74/866 |
| 4,949,595 | 8/1990 | Shimanaka | 74/866 |
| 4,967,620 | 11/1990 | Shimanaka | 74/866 |
| 4,969,099 | 11/1990 | Iwatsuki et al. | 74/866 X |
| 4,998,200 | 3/1991 | Glowczewski et al. | 74/866 X |

FOREIGN PATENT DOCUMENTS

| | | | |
|---|---|---|---|
| 61-248949 | 11/1986 | Japan | 74/866 |
| 62-159842 | 7/1987 | Japan | 74/866 |

*Primary Examiner*—Leslie A. Braun
*Assistant Examiner*—David E. Henn
*Attorney, Agent, or Firm*—Foley & Lardner

[57] ABSTRACT

A line pressure control for an automatic transmission comprising a communication line which allows communication of an engine control unit with an automatic transmission control unit. When the communication line is in an abnormal state, the result from learning is not employed for adjusting the magnitude of a line pressure.

4 Claims, 5 Drawing Sheets

MOTOR VEHICLE WITH LINE PRESSURE CONTROL FOR AUTOMATIC TRANSMISSION

RELATED CO-PENDING APPLICATIONS

The following co-pending U.S. Patents and Applications are related to the present application:

U.S. Patent Application Ser. No. 07/289,050 filed on Dec. 23, 1988 by Hiroshi YAMAGUCHI, now U.S. Pat. No. 4,981,053. This U.S. Patent Application corresponds to European Patent Application No. 88 121 587.5 filed on Dec. 23, 1988 and published under publication No. 0 323 618 on July 12, 1989.

U.S. Patent Application Ser. No. 07/306,606 filed on Feb. 6, 1989 by Akihiko SANO, now U.S. Pat. No. 4,982,621.

U.S. Patent Application Ser. No. 07/336,430 filed on Apr. 11, 1989 by Yasushi NARITA now U.S. Pat. No. 4,972,738. This U.S. Patent Application corresponds to European Patent Application No. 89 106 419.8 filed on Apr. 11, 1989.

U.S. Patent Application Ser. No. 07/337,869 filed on Apr. 14, 1989 by Yasushi NARITA, now U.S. Pat. No. 4,955,259. This U.S. Patent corresponds to European Patent Application No. 89 106 797.7 filed on Apr. 17, 1989.

U.S. Patent Application Ser. No. 07/382,120 filed on July 19, 1989 by Yasushi NARITA, now U.S. Pat. No. 5,007,308. This U.S. Patent Application corresponds to European Patent Application No. 89 113 253.2 filed on July 19, 1989.

U.S Patent Application Ser. No. 510,553 concurrently filed with the present application by the same applicant, Hiroshi YAMAGUCHI on Apr. 18, 1990.

BACKGROUND OF THE INVENTION

The present invention relates to a motor vehicle with a line pressure control for an automatic transmission, and more particularly to a line pressure control during occurrence of a shifting between one gear ratio and another gear ratio in an automatic transmission.

In the automatic transmission, a desired gear ratio is established by hydraulically activating selected one or ones of various friction devices (such as clutches and brakes) by line pressure, and a shift between two gear ratios is effected by changing friction device or devices to be activated.

If the line pressure is excessively high, transient engagement capacity of the friction device becomes excessively high, causing great shift shock to occur, whereas if the line pressure is excessively low, the transient engagement capacity of the friction device becomes excessively low, causing a slip to occur, thus shortening an operating life of the friction device. Thus, the line pressure has to be appropriately controlled. Conventionally, as described in the publication entitled "SERVICE MANUAL FOR AUTOMATIC TRANSMISSION OF THE RE4R01A TYPE" (A261C07) published in March 1987 by NISSAN MOTOR COMPANY, LIMITED, a drain circuit of a line pressure regulator valve is opened or closed by a line pressure solenoid of the duty cycle type. The duty varies from 0% to 100%. When the duty is 0%, the line pressure solenoid is left OFF, closing the drain circuit, while when the duty is 100%, the line pressure solenoid is left ON, opening the drain circuit. Thus, increasing the duty causes the line pressure regulator to increase a magnitude of line pressure generated thereby. Various values of the duty are contained in a table data stored in a ROM of a microcomputer of an automatic transmission control unit. Different table data are provided, one for use during the shifting operation, and another for use at the normal stable non-shifting operation, for example. The duty values are retrievable out of each table data by a table look-up operation using a variable such as a throttle opening degree.

However, this conventional line pressure control cannot cope with a situation where the line pressure solenoid has a manufacturing variation and/or a degradation of characteristic over time, or a situation where the friction device has a manufacturing variation and/or a wear degradation over time. In the former situation, even if the line pressure solenoid is subject to the same duty, the magnitude of line pressure deviates from a target value. In the latter situation, even if the magnitude of line pressure is adjusted to the target value, the friction device does not show a desired performance characteristic. Thus, in any event, the conventional line pressure control fails to avoid occurrence of substantial shift shock or reduction in operating life of the friction device.

When a shift solenoid is switched from ON state to OFF state at a time in a manner to effect a 1—2 upshift of the automatic transmission, a pressure level for the second gear operation increases so as to induce the engagement of a given friction device. This produces a change in a rotational speed ratio of a transmission input shaft to a transmission output shaft from a value corresponding to the first gear to that which corresponds to the second gear. A process of the change in the rotational speed ratio at a low line pressure level is different from that at a high line pressure level. Accordingly, it is possible to determine from a time required for the change in the rotational speed ratio, viz., the duration of an inertia phase, whether an actual line pressure is adequate or not. Thus, a line pressure control is proposed in the co-pending U.S. Patent Application Ser. No. 07/289,050, now U.S. Pat. No. 4,981,053, in which the duration of the inertia phase is measured during shifting, and the measured duration is compared with a target value. A correction value, which is obtained from the difference between the two, is used for adjusting the line pressure during the next shifting. Such a control is called a learning control.

The automatic transmission is controlled in response to signals from various sensors which indicate operating conditions of a motor vehicle such as an engine operating state. Thus, the signals are transmitted through a communication line from an engine control unit to an automatic transmission control unit. However, if the line pressure learning control is kept employed even though it cannot be judged whether an engine system operates normally or not, due to an abnormality of the communication line, the line pressure learning control may actually degrade the quality of shifting by using the inaccurate learning data obtained.

The present invention aims at improving a line pressure control in a motor vehicle such that line pressure learning control is not employed when a communication line between an engine control unit and a transmission control unit is in an abnormal state.

SUMMARY OF THE INVENTION

It is an object of the invention to provide a line pressure control for an automatic transmission which does not implement a correction of line pressure data routine if the communication line between the engine control unit and automatic transmission control is in an abnormal state.

According to the present invention, the above objectives are met by providing in a motor vehicle having an internal combustion engine, and an automatic transmission which includes a transmission output member and a transmission input member drivingly connected to the internal combustion engine, the automatic transmission being shiftable between one gear ratio and another gear ratio and including a friction device which is adapted to be engaged in response to a magnitude of a line pressure to effect a shifting between the one and another gear ratios the following:

An engine control unit for controlling the internal combustion engine and a transmission control unit for controlling the automatic transmission. A communication line is also provided which interconnects the engine and automatic transmission control units and transmits information between the engine and transmission control unit. The transmission control unit contains line pressure data representing a magnitude of the line pressure to be supplied to the friction device during the shifting. The transmission control unit further includes a means for determining whether or not the communication line is in an abnormal state during shifting and for generating an abnormality indicative signal when the communication line is abnormal.

The transmission control unit also evaluates the quality of the shifting after the occurrence of the shifting and corrects the line pressure data in response to the result of evaluating the quality of the shifting when a predetermined condition is satisfied and upon absence of the abnormality indicative signal, but leaves the line pressure data unchanged when the abnormality indicative signal is present.

Finally, the transmission control unit adjusts the magnitude of the line pressure supplied to engage the friction device in accordance with the line pressure data during the next occurrence of shifting.

According to another aspect of the present invention, there is provided, in a motor vehicle having an internal combustion engine, and an automatic transmission including a transmission output member and a transmission input member drivingly connected to the internal combustion engine, the automatic transmission being shiftable between one gear ratio and another gear ratio and including a friction device which is adapted to be engaged in response to a magnitude of a line pressure to effect a shifting between the one and another gear ratios.

An input sensor is provided for detecting a revolution sped of the transmission input member and for generating a first sensor output signal which is indicative of the revolution speed of the transmission input member detected. In addition, an output sensor for detecting a revolution speed of the transmission output member and for generating a second sensor output signal which is indicative of the revolution speed of the transmission output member detected is also provided. In addition, an engine control unit for controlling the internal combustion engine and transmission control unit for controlling the automatic transmission are provided and connected by a communication line which transmits information between the engine and transmission control unit.

The transmission control unit determines whether or not the communication line is abnormal upon the occurrence of shifting and generates an abnormality indicative signal when the communication line is abnormal. The transmission control unit also communicates with the first and second sensor output signals to determine an actual gear ratio of the revolution speed of the transmission speed of the transmission input member to the revolution speed of the transmission output member.

The transmission control unit also sets a predetermined range determined in view of the one and another gear ratios and repeatedly checks whether or not the actual gear ratio determined falls in the predetermined range, and initiates a timer when the actual gear ratio falls in the predetermined range.

Furthermore, the transmission control unit compares the content of the timer with a predetermined value after the completion of the shifting, at least when the abnormality indicative signal is absent, and adjusts the magnitude of the line pressure which engages the friction device during the next occurrence of the shifting in response to a result from comparing the content of the timer with the predetermined value.

According to a further aspect of the present invention, there is provided a line pressure control method in a motor vehicle which has an internal combustion engine, and an automatic transmission including a transmission output member and a transmission input member drivingly connected to the internal combustion engine, the automatic transmission being shiftable between one gear ratio and another gear ratio and including a friction device which is adapted to be engaged in response to a magnitude of a line pressure to effect a shifting between the one and another gear ratios, the motor vehicle also having engine control unit means for controlling the internal combustion engine, automatic transmission control unit means for controlling the automatic transmission, the automatic transmission control unit including a line pressure data, and a communication line interconnecting the engine and transmission control unit means. The line pressure control method steps are as follows:

determining whether or not the communication line is abnormal upon occurrence of shifting and generating an abnormality indicative signal when the communication line is abnormal;

detecting a revolution speed of the transmission input member and generating a first sensor output signal indicative of the revolution speed of the transmission input member detected;

detecting a revolution speed of the transmission output member and generating a second sensor output member and generating a second sensor output signal indicative of the revolution speed of the transmission output member detected;

determining responsive to the first and second sensor output signals an actual gear ratio of the revolution speed of the transmission input member to the revolution speed of the transmission output member;

setting a predetermined range determined in view of the one and another gear ratios;

repeatedly checking whether or not the actual gear ratio determined falls in the predetermined range and incrementing a timer when the actual gear ratio falls in the predetermined range;

comparing the content of the timer with a predetermined value after the completion of the shifting;

correcting the line pressure data in response to the result from comparing the content of the timer with the predetermined value at least when the abnormality indicative signal is absent; and adjusting the magnitude of the line pressure which engages the friction device during the next occurrent of the shifting in response to the line pressure data.

BRIEF DESCRIPTION OF THE DRAWINGS

FIG. 5 shows a characteristic of variation of duty ratio which a line pressure solenoid is subject to.

DETAILED DESCRIPTION OF THE PREFERRED EMBODIMENTS

Referring to the accompanying drawings, the present invention is described below.

Figure 1:
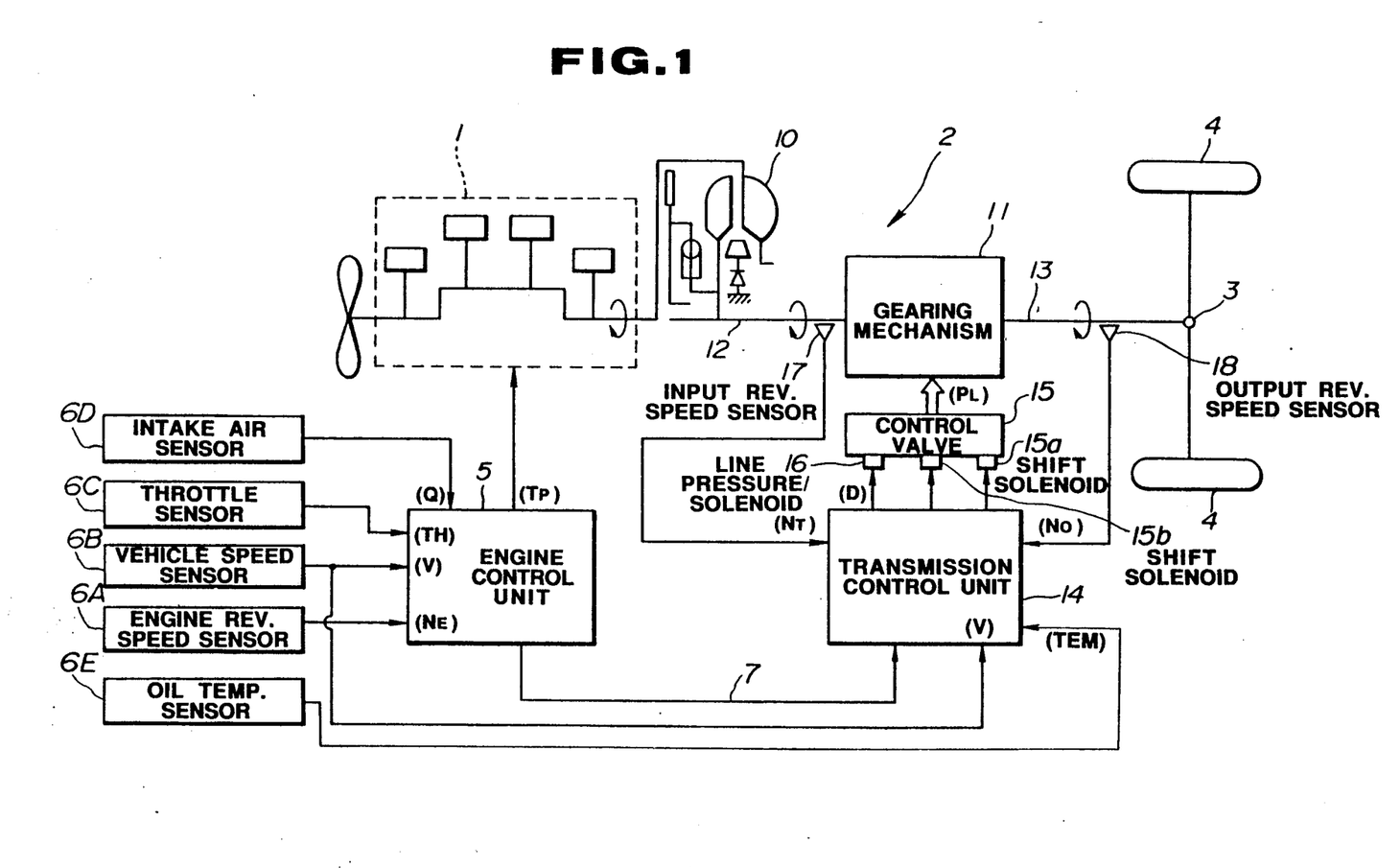
FIG. 1 is a block diagram of a motor vehicle incorporating a line pressure control according to the present invention.

FIG. 1, a motor vehicle, includes a line pressure control system. In FIG. 1, the reference numeral 1 designates an electronic fuel injection internal combustion engine, 2 an automatic transmission, 3 a differential gear, and 4 a pair of traction wheels.

The engine 1 is provided with a microcomputer based engine control unit 5. Supplied to the control unit 5 are output signals of an engine revolution speed sensor 6A arranged to detect an engine revolution speed $N_E$, a vehicle speed sensor 6B arranged to detect a vehicle speed V, a throttle sensor 6C arranged to detect an engine throttle opening degree TH, and an intake air sensor 6D arranged to detect an amount of an engine intake air Q. The control unit 5 determines a width $T_P$ of a fuel injection pulse, and an ignition timing based on the signals from these sensors. Output signals of the control unit 5 indicative of the pulse width $T_P$ and the it 5 indicative of the pulse width $T_P$ and the ignition timing determined are supplied to the engine 1. Thus, the engine 1 is supplied with an amount of fuel corresponding to the fuel injection pulse width $T_P$, and operates on combustion of the fuel supplied in response to engine rotation.

The automatic transmission 2 includes a torque converter 10, and a change-sped gearing mechanism 11 which are arranged in tandem. Engine power is delivered to a transmission input shaft 12 via the torque converter 11. A revolution of the transmission input shaft 12 is increased or decreased in accordance with a selected gear ratio of a change-speed gearing mechanism 11, and delivered to a transmission output shaft 13. A revolution of the output shaft 13 is transmitted to the pair of traction wheels 4 via the differential gear 3.

The change-speed gearing mechanism 11 involves various friction devices such as clutches and brakes (not shown) which are selective activated by a line pressure $P_L$ to establish a desired gear ratio. A shift between two gear ratios is effected by changing the friction device or devices to be activated.

In order to control a gear ratio change in the change-speed gearing mechanism 11, a microcomputer based automatic transmission control unit 14, and a control valve assembly 15 are provided. The control valve assembly 15 includes a shift solenoid 15a and a shift solenoid 15b. These shift solenoids 15a and 15b are selectively energized and thus rendered ON. In response to various combinations of ON/OFF state of these shift solenoids 15a and 15b, the line pressure $P_L$ is supplied to the various friction devices, selectively, to establish a gear ratio corresponding to an ON/OFF combination selected. The control valve assembly 15 also includes a duty solenoid 16 for controlling the line pressure $P_L$. This duty solenoid 16 is activated in accordance with a drive duty D supplied thereto, and increases the magnitude of line pressure $P_L$ in response to an increase in the drive duty D. Supplied to the transmission control unit 14 are output signals of the vehicle speed sensor 6B, an input revolution speed sensor 17 arranged to detect a revolution speed $N_T$ of the input shaft 12, an output revolution speed sensor 18 arranged to detect a revolution speed $N_O$ of the output shaft 13, and a hydraulic fluid temperature sensor 6E arranged to detect a temperature TEM of hydraulic fluid used in the automatic transmission 2. Also supplied to the transmission control unit 14 via a communication line 7 is a signal from the control unit 5 indicative of whether or not an engine torque control during shifting operation has been carried out. Still also supplied to the transmission control unit 14 via the communication line 7 is a signal from the engine control unit 5 indicative of whether or not a function of the engine control unit 5 to receive signals from the transmission control unit 14 is abnormal.

Figure 2:
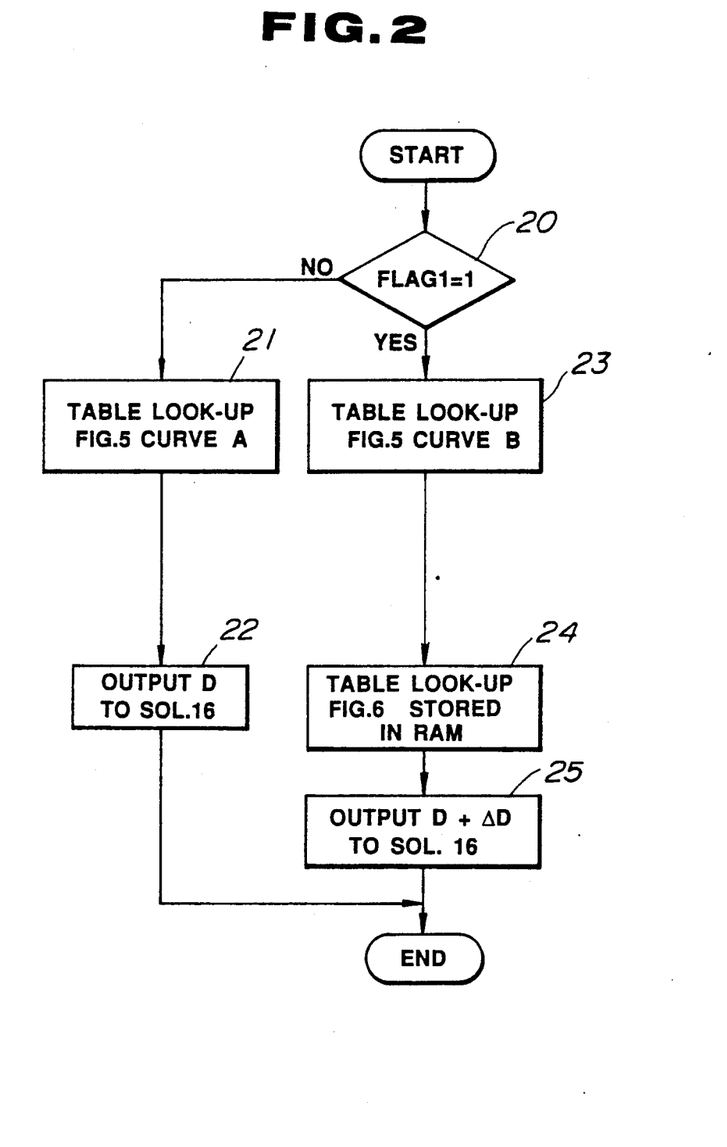
FIGS. 2 to 4 are flow charts of a line pressure control program and a shift control program.
Figure 3:
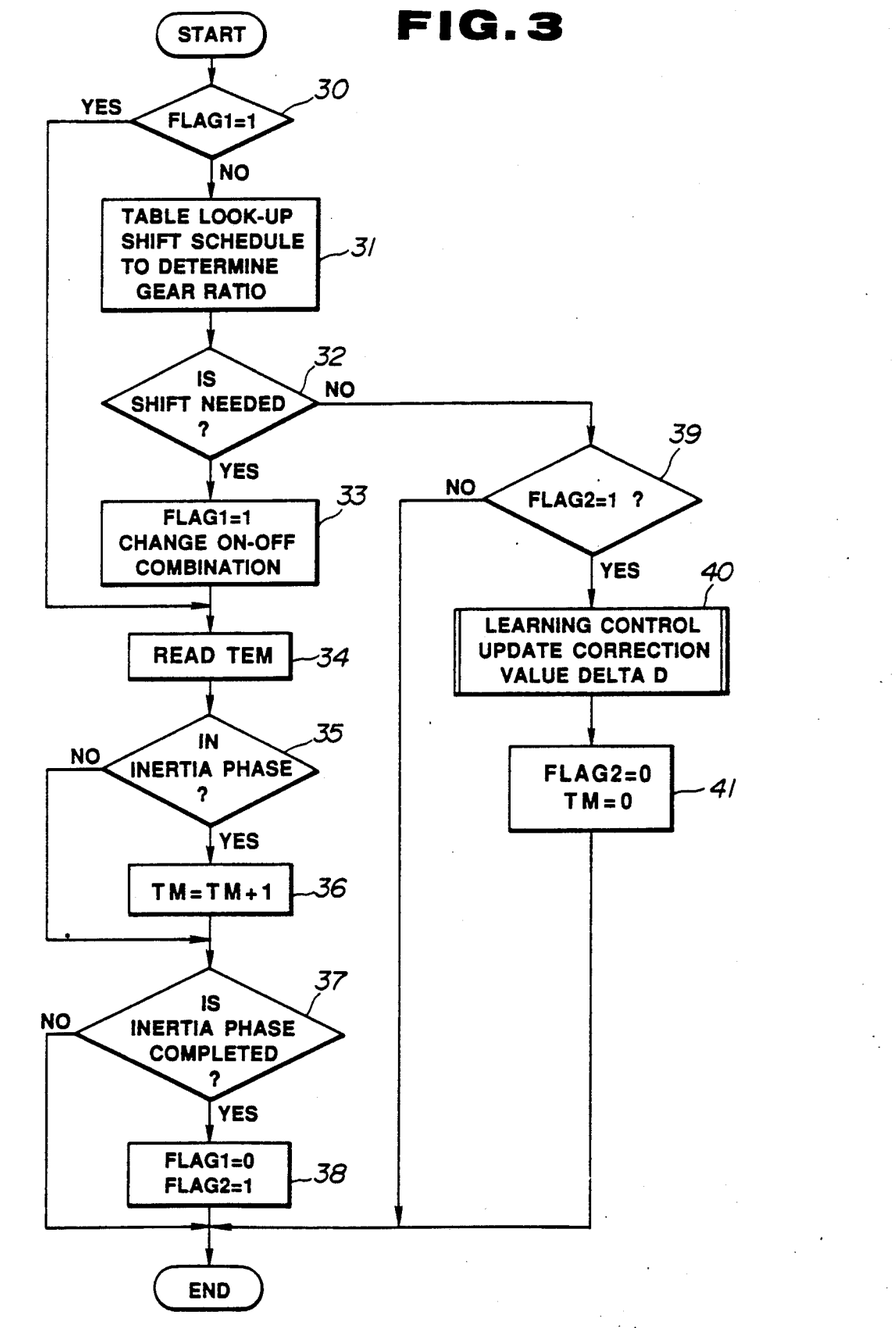
Figure 4:
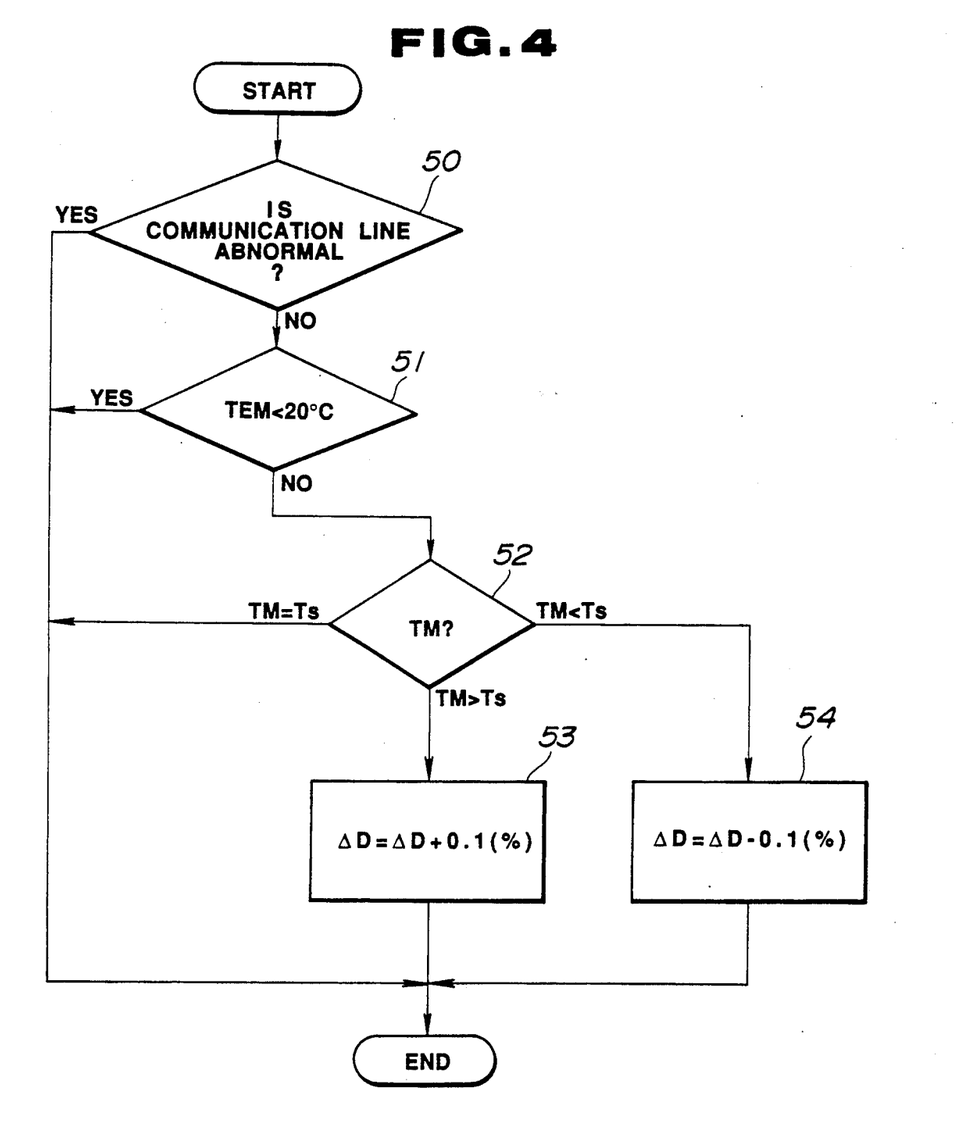

The transmission control unit 14 includes a ROM (Read Only Memory) which stores control programs illustrated by the flow charts shown in FIGS. 2 to 4, and effects a line pressure control and a ratio change control.

The transmission 2, which includes the change-speed gearing mechanism 11, and the control valve assembly 15 with two shift solenoids 15a and 15b and a line pressure solenoid 16 is well known and described in detail in the aforementioned publication entitled "SERVICE MANUAL FOR AUTOMATIC TRANSMISSION OF THE RE4R01A TYPE" (A261C07) published in March 1987 by NISSAN MOTOR COMPANY, LIMITED. In order to fully understand how a gear ratio change is carried out by the two shift solenoids 15a and 15b, and how the magnitude of line pressure is adjusted by the line pressure solenoid 16, reference should be made to U.S. Pat. No. 4,680,992, issued to Hayasaki et al. on July 21, 1987, which has been herein incorporated by reference in its entirety (see shift solenoids 42 and 44, and a line pressure solenoid 24 in FIGS. 1A, 1B and 1C).

Figure 5:
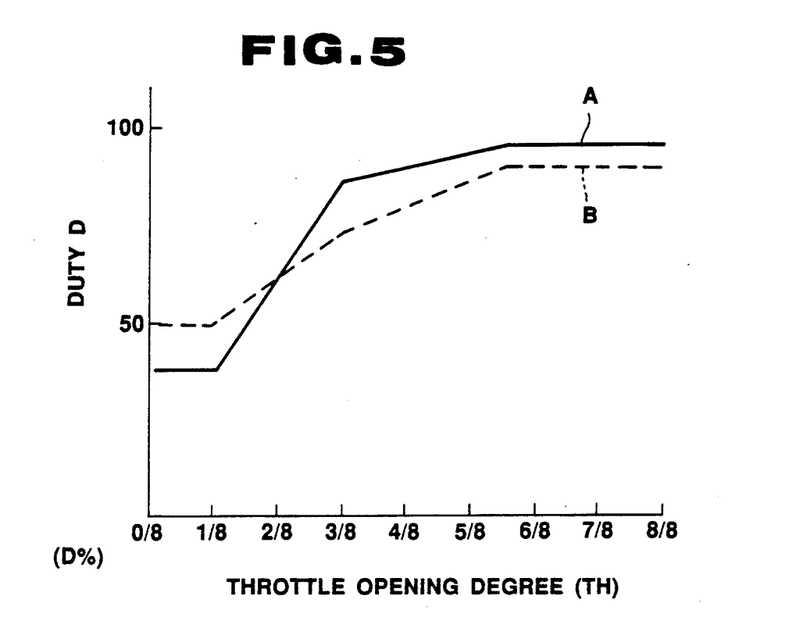

Referring to FIG. 2, the line pressure control will be explained. The execution of this line pressure control is initiated by a time interruption. In FIG. 2, at a step 20, it is checked whether a flag FLAG1 is equal to 1 or not. The FLAG1 is equal to when the change-speed gearing mechanism 11 is shifting, while the FLAG1 is not equal to 1 when it is not shifting. Thus, when the change-speed gearing mechanism 11 is not shifting, the control proceeds from the step 20 to a step 21 where a table look-up operation is performed using a throttle opening degree TH to obtain a duty D which the line pressure solenoid 16 is subject to from a table data for non-shifting as illustrated by a fully drawn characteristic curve A in FIG. 5, in which the duty D corresponds to the throttle opening degree TH. Then, at a step 22, this duty D obtained at the step 21 is outputted to the line pressure solenoid 16, thus adjusting the line pressure $P_L$ to an appropriate value for nonshifting operation.

Figure 6:
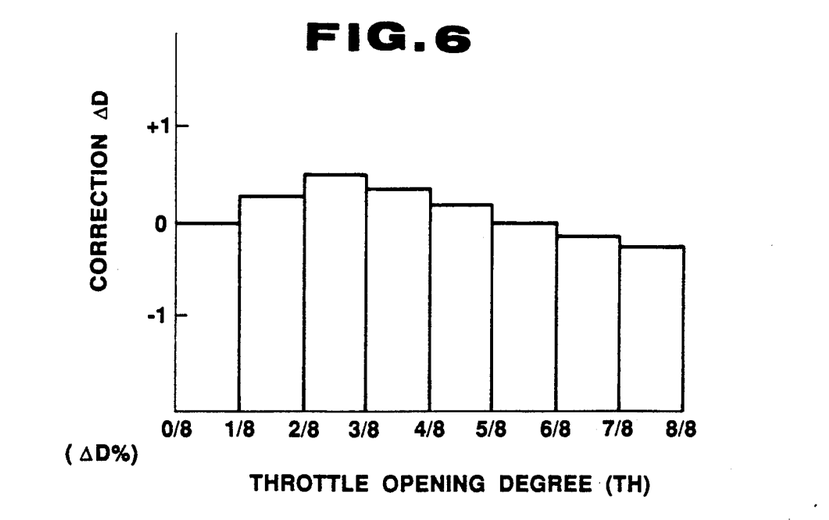
FIG. 6 is a diagram illustrating duty correction values contained in a table data stored in a RAM.

When the change-speed gearing mechanism 11 is shifting, the answer to the inquiry at the step 20 is YES, and the control proceeds to a step 23. At the step 23, there is performed a table look-up operation of a table data as illustrated by a broken line characteristic curve B in FIG. 5 using the throttle opening degree TH to obtain a duty D for line pressure control, in which the duty D corresponds to the throttle opening degree TH. AT the subsequent step 24, a table look-up operation of a table data as shown in FIG. 6 is performed using the throttle opening degree TH to obtain a duty correction value $\Delta D$ (delta D) corresponding to the throttle opening degree TH. The table data as illustrated in FIG. 6 is stored in a RAM (Random Access Memory) of the transmission control unit 14, and contains various duty correction values which are updated after a line pressure learning control program is employed which will be described hereinafter. Then the control proceeds to a step 25 where a sum $D + \Delta D$ (delta D) is outputted to the line pressure solenoid 16, thus adjusting the line pressure $P_L$ to the appropriate value for shifting operation.

Referring to FIG. 3, there is shown a control program for effecting a shift control and a line pressure solenoid duty correction value control. The execution of this control program is initiated by a time interruption. In FIG. 3, at a step 30, it is checked whether the flag FLAG1 is equal to 1 or not. If the change-speed gearing mechanism 11 is not shifting and thus the flag FLAG1 is not equal to 1 the control proceeds from the step 30 to a step 31. At the step 31, using a predetermined shift schedule diagram, a desired gear ratio is determined which corresponds to vehicle speed V and throttle opening degree TH. Then, the control proceeds to a step 32 where it is judged whether a shifting is needed or not based on whether or not a current gear ratio is the same as the required gear ratio determined at the step 31. If a shift is needed and thus the answer to the inquiry at the step 32 is YES, the control proceeds from the step 32 to a step 33. At the step 33, the flag FLAG 1 is set equal to 1, and an ON/OFF combination of the shift solenoids 15a and 15b is changed to establish the required gear ratio in the change-speed gearing mechanism 11. In the next subsequent run, the steps 31, 32 and 33 are skipped as long as the flag FLAG1 continues to be equal to 1.

At the subsequent step 34, the temperature TEM of hydraulic fluid of the automatic transmission 2 is read. Then, the control proceeds to a step 35 where it is checked whether or not an actual gear ratio $N_T/N_O$ falls in a predetermined range determined in view of gear ratio before the shifting and a gear ratio upon completion of the shifting. In this case, it is recognized that the inertia phase proceeds when the answer to inquiry at the step 35 is YES. If the answer to the inquiry at the step 35 is YES, the control proceeds to a step 36 where an increment is made to a timer TM. Upon termination of the inertia phase, the control proceeds from the step 35 to a step 37 skipping the step 36. It will now be noted that the content of the timer TM represents a period of time when the inertia phase proceeds, viz., an inertia phase time.

At the subsequent step 37, it is checked whether the inertia phase is completed or not. This step is cooperating with the step 35 such that the answer to the inquiry at the step 37 becomes NO when the answer to the inquiry at the step 35 is YES, while the answer to the inquiry at the step 37 becomes YES when the answer to the inquiry at the step 35 is NO. Thus when the inertia phase is completed, the control proceeds from the step 37 to a step 38 where the flag FLAG1 is reset to 0 (zero) and a flag FLAG2 is set equal to 1. This flag FLAG2 indicates whether a line pressure learning control which will be described hereinafter is to be executed or not.

In the next run after completion of the shifting, the control proceeds from the step 32 to a step 39. At the step 39, it is checked whether the flag FLAG2 is set equal to 1 or not. In this situation, the control proceeds from the step 39 to a step 40 where the learning control program which will be described hereinbelow in connection with FIG. 4 is effected to update the duty correction data $\Delta D$ (delta D) illustrated in FIG. 6. At the subsequent step 41, the flag FLAG2 and the timer TM are cleared.

Referring to FIG. 4, the execution of the line pressure learning control program is initiated by a time interruption. In FIG. 4, at a step 50, it is checked whether the communication line is in an abnormal state or not based on the fact that an input signal to the transmission control unit 14 remains constant at a high (H) level or a low (L) level for a predetermined period of time, for example. When the answer to the inquiry at the step 50 is NO, the control proceeds from the step 50 to a step 51. At the step 51, it is checked whether the temperature TEM of hydraulic fluid is lower than a predetermined value, for example 20° C., for example, or not. When the temperature TEM is not lower than 20° C., the control proceeds to a step 52 where the inertia phase time TM is checked. If the inertia phase time TM is equal to a predetermined value $T_S$ where the appropriate magnitude of line pressure is provided, the RAM data containing various correction values $\Delta D$ (delta D) as shown in FIG. 6 are not modified, and used for the line pressure control for a shifting which is to take place next time. The predetermined value $T_S$, as mentioned above, differs from one kind of shifting to another, and it also differs depending on the throttle opening degree TH even with the same kind of shifting.

However, if the inertia phase time TM is greater than the predetermined value $T_S$, and thus the line pressure was relatively low to invite shortening of operating life of the friction device, the control proceeds from the step 52 to a step 53 where the correction value $\Delta D$ (delta D) in the RAM data is increased by 0.1%. Thus, the magnitude of line pressure during the next shifting will be increased in accordance with this increase since the duty $D + \Delta D$ (delta D) has been increased.

If the inertia phase time TM is less than the predetermined value $T_S$, the control proceeds from the step 52 to a step 54 since, in the situation, the line pressure is excessively high so that the engagement capacity of the friction device becomes excessively large to result in producing substantially great shock. At the step 54, the correction value $\Delta D$ (delta D) at the RAM data is decreased by 0.1%, and used for the next shifting. Therefore, the magnitude of line pressure is decreased during the next shifting, preventing the occurrence of shift shock.

As will now be understood from the above description, the magnitude of line pressure is kept at the most appropriate value by correcting data which the magnitude of line pressure is determined by learning wherein the data is corrected in such a direction as to hold the inertia phase time TM at the predetermined value $T_S$. Thus, a shock-free shifting without any reduction in operating life of the friction device is assured even in a situation where there are manufacturing variations and/or degradation with time of component parts.

At the steps 50 and 51 shown in FIG. 4, when it is determined that the communication line is in an abnormal state, or that the temperature TEM is lower than 20° C., the control comes to an end. The RAM data containing various correction values ΔD (delta D) as shown in FIG. 6 are not modified, and used for the line pressure control for a shifting which is to take place next time, thus inhibiting the learning control program. As a result, even if the communication line 7 is in an abnormal state, or if the system including the line pressure solenoid 16 is unstable at the low temperature TEM, the inhibition of the learning control program prevents the line pressure control from being incorrect. If desired, the inhibition of the learning control based on the temperature of hydraulic fluid may be omitted.

What is claimed is:

1. In a motor vehicle having an internal combustion engine and an automatic transmission including a transmission output member and a transmission input member drivingly connected to the internal combustion engine, the automatic transmission being shiftable between one gear ratio and another gear ratio and including a friction device which is adapted to be engaged in response to a magnitude of a line pressure to effect a shifting betgeen the one and another gear ratios:

engine control unit means for controlling the internal combustion engine;

transmission control unit means for controlling the automatic transmission;

a communication line interconnecting said engine and automatic transmission control unit means to transmit information between said englne and transmission control unit means;

said transmission control unit means containing a line pressure data containing a magnltude of the line pressure to be supplied to the friction device during the shifting.

said transmission control unit means including.

means for determining whether or not said communication line is abnormal upon occurrence of the shifting and generating an abnormality indicative signal when said comunication line is abnormal, means for evaluating quality of the shifting after said occurrence of the shiting.

means for correcting said line pressure data in response to result of evaluating the quality of the shifting when a predetermined condition is satisfied upon absence of said abnormality indicative signal, but leaving said line pressure data unchanged when said abnormality indicative signal is present;

means for adjusting the magnitude of the line pressure supplied to engage the friction device in accordance with said line pressure data upon the next occurrence of the shifting.

2. In a motor vehicle having an internal combustion engine, and an automatic transmission including a transmission output member and a transmission input member drivingly connected to the internal combustion engine, and the automatic transmission being shiftable between one gear ratio and another gear ratio and including a friction device which is adapted to be engaged in response to a magnitude of a line pressure to effect a shifting between the one and another gear ratios:

input sensor means for detecting a revolution speed of the transmission input member and generating a first sensor output signal indicative of said revolution speed of the transmission input member detected;

output sensor means for detecting a revolution speed of the transmission output member and generating a second sensor output signal indicative of said revolution speed of the transmission output member detected;

engine control unit means for controlling the internal combustion engine;

transmission control unit means for controlling the automatic transmission;

a communication line interconnecting said engine and automatic transmission control unit means to transmit information between said engine and transmission control unit means;

said transmission control unit means including, means for determining whether or not said communication line is abnormal upon occurrence of the shifting and generating an abnormality indicative signal when said communication line is abnormal, means responsive to said first and second sensor output signals for determining an actual gear ratio of said revolution speed of the transmission speed of the transmission input member to said revolution speed of the transmission output member, means for setting a predetermined range determined in view of the one and another gear ratios, means for repeatedly checking whether or not said actual gear ratio determined falls in said predetermined range and incrementing a timer when said actual gear ratio falls in said predetermined range, means for comparing the content of said timer with a predetermined value after the completion of the shifting only when said abnormality indicative signal is absent; and means for adjusting the magnitude of the line pressure which engages the friction device upon the next occurrence of the shifting in response to result from comparing the content of said timer with said predetermined value.

3. A motor vehicle as claimed in claim 2, wherein said adjusting means include a line pressure solenoid, and said transmission control unit means contains first data, and second correction data, said transmission control unit means including means for controlling a drive signal supplied to said line pressure solenoid in response to a sum of said first data and said second correction data, and means for modifying said second correction data in response to said result from comparing the content of said timer with said predetermined value.

4. A line pressure control method in a motor vehicle having an internal combustion engine, and an automatic transmission including a transmission output member and a transmission input member drivingly connected to the internal combustion engine, the automatic transmission input member drivingly connected to the internal combustion engine, the automatic transmission being shiftable between a first gear ratio and a second gear ratio and including a friction device which is adapted to be engaged in response to a magnitude of a line pressure to effect a shifting between the first and second gear ratios, the motor vehicle also having engine control unit means for controlling the internal combustion engine, automatic transmission control unit means for controlling the automatic transmission, the automatic transmission control unit including a line pressure data, and a communication line interconnecting the engine and transmission control unit means, the line pressure control method comprising the steps of:

determining whether or not the communication line is in an abnormal state upon occurrence of the shifting and generating an abnormality indicative signal when the communication line is in an abnormal state;

detecting a revolution speed of the transmission input member and generating a first sensor output signal indicative of said revolution speed of the transmission input member detected;

detecting a revolution speed of the transmission output member and generating a second sensor output signal indicative of said revolution speed of the transmission output member detected;

determining responsive to said first and second sensor output signals an actual gear ratio of said revolution speed of the transmission input member to said revolution speed of the transmission output member;

setting a predetermined range for the shifting as determined in view of the first and second gear ratios;

repeatedly checking whether or not said actual gear ratio determined falls in said predetermined range and incrementing a timer when said actual gear ratio falls in said predetermined range;

comparing the content of said timer with a predetermined value after the completion of the shifting only when said abnormality indicative signal is absent;

correcting the line pressure data in response to result from comparing the content of said timer with said predetermined value; and adjusting the magnitude of the line pressure which engages the friction device during the next occurrence of the shifting in response to the line pressure data.

* * * * *